May 14, 1946.  D. SILVERMAN  2,400,170
TIME CYCLE TELEMETERING
Filed Aug. 29, 1942  4 Sheets-Sheet 2
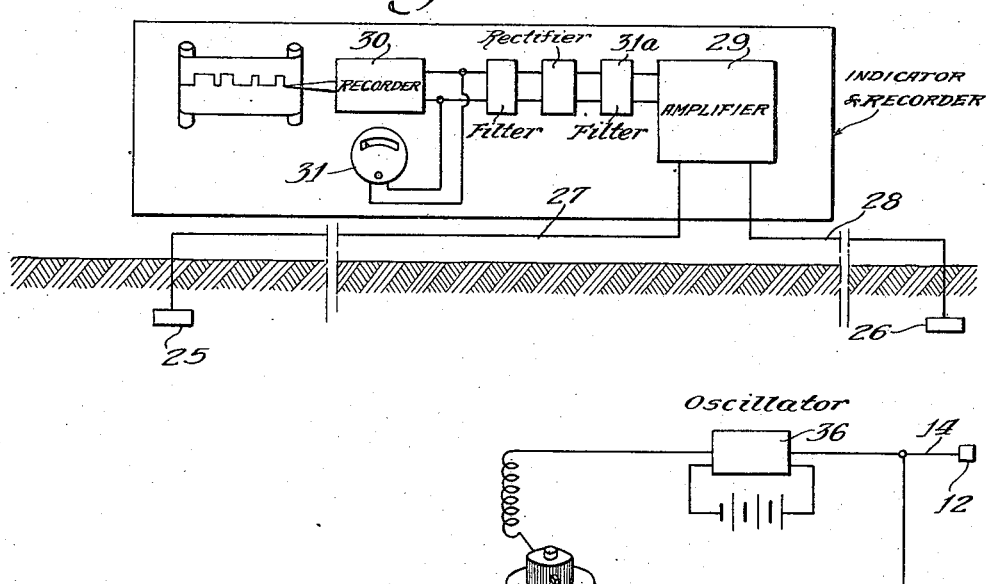
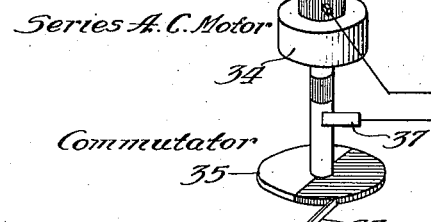
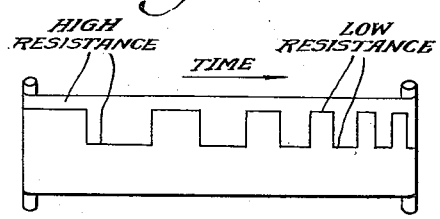
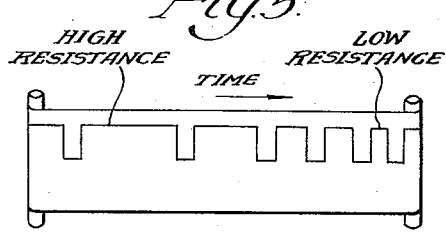
Inventor:
Daniel Silverman
By Youart H. Kerslake
Attorney

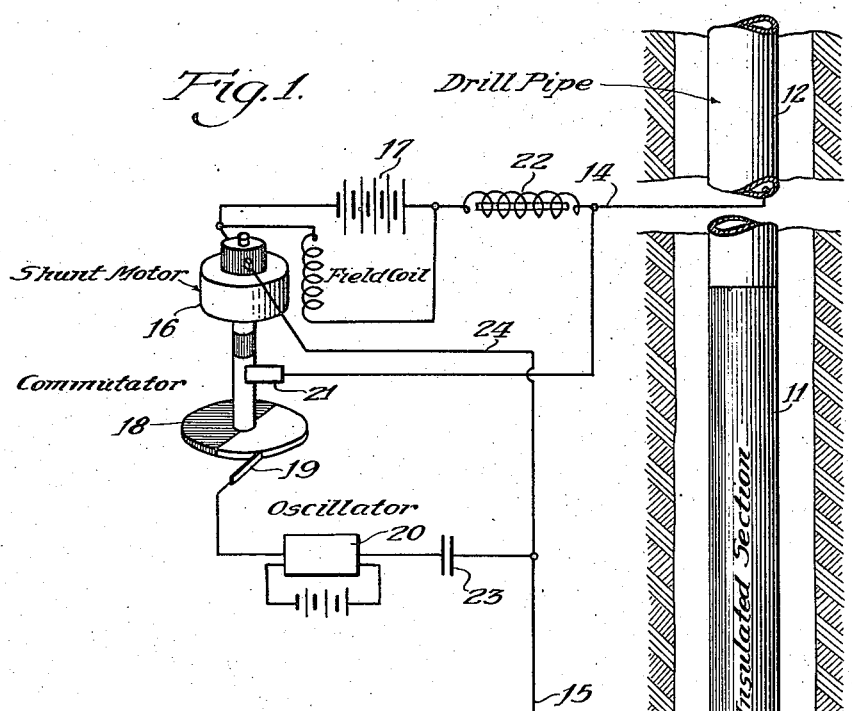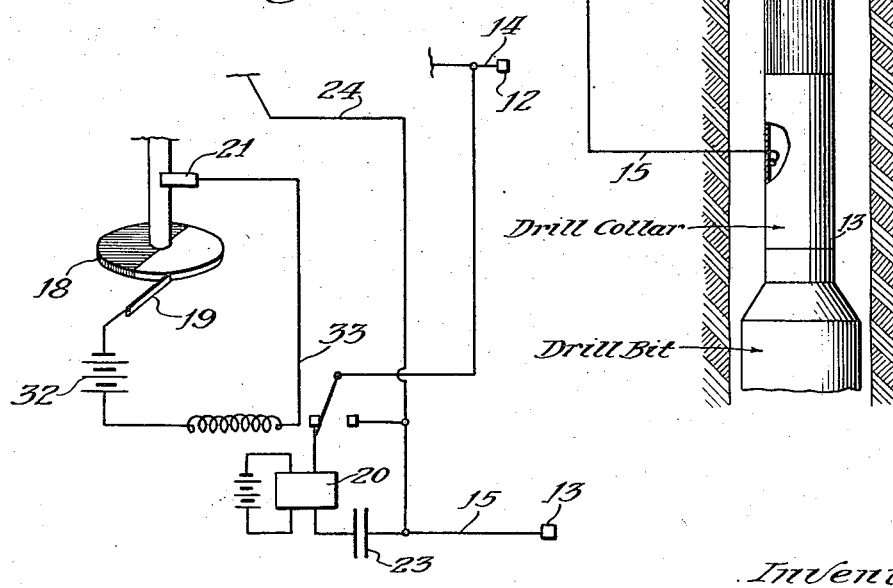

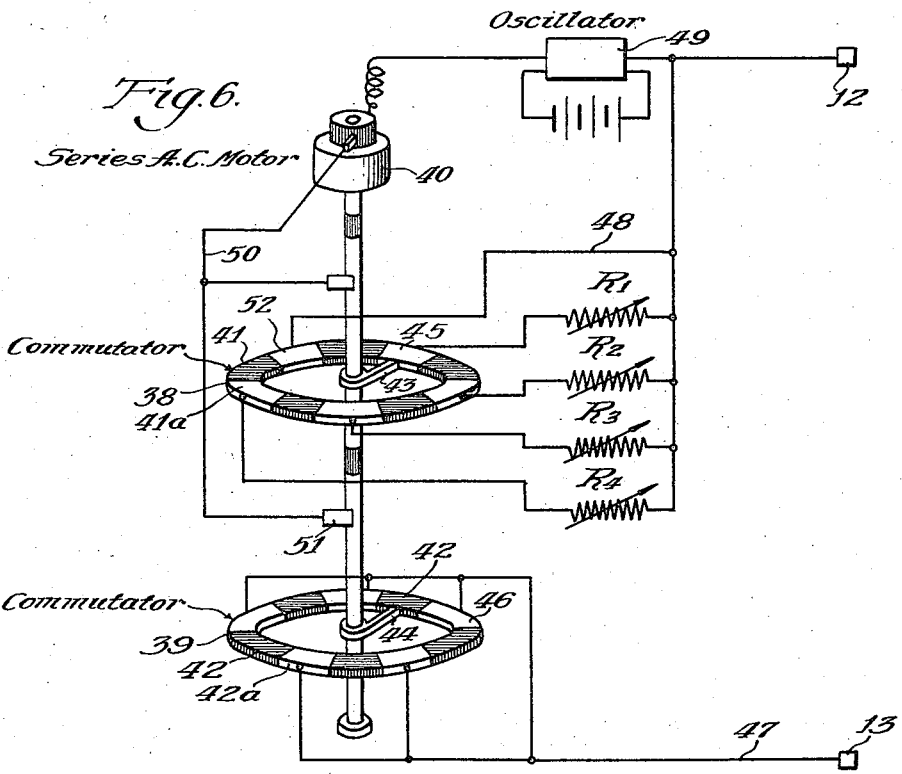
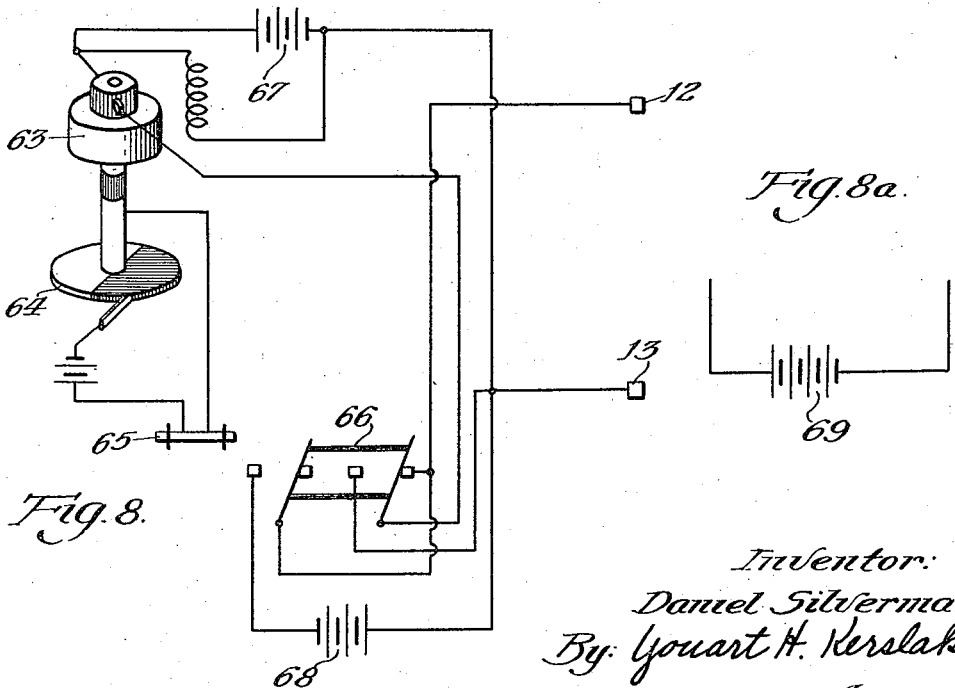

X. Resistance of Formation
Y. No Resistance, Motor Full Speed
R₁ Resistance of Drilling Mud
R₂ Torque of Drill Pipe
R₃ Compression (or Tension) of Drill Pipe
R₄ Temperature of Drill Pipe Inventor:
Daniel Silverman
By: Gouart H. Kerslake
Attorney Patented May 14, 1946

2,400,170

UNITED STATES PATENT OFFICE 2,400,170

TIME CYCLE TELEMETERING

Daniel Silverman, Tulsa, Okla., assignor to Stanolind Oil and Gas Company, Tulsa, Okla., a corporation of Delaware Application August 29, 1942, Serial No. 456,664

14 Claims. (Cl. 177—351)

The present invention relates to electrical methods and apparatus for measuring and recording varying information at a point removed from the scene of the variations such as telemetering and more particularly to electrical well logging for determining the nature of different strata through which the well passes as well as obtaining other valuable information relative to the well-drilling operation.

The present invention may be utilized whenever the desired measurement can be converted into an electrical variation as, for instance, electrical resistance, reactance or impedance, and whenever it is impracticable to record the measurements at the place where they are made. Examples of circumstances when use may be made of the present invention are in determining by electrical resistivity the nature of liquids flowing through conduits, determining leakage from pipes, determining the liquid level in distant tanks, determining the temperature at an inaccessible place in a furnace or refrigerated zone, and the like.

The present invention is particularly useful in the art of well logging and it will be described with reference to such art, but I wish to emphasize that the essential characteristics of the invention may be utilized in other fields as well.

It is highly desirable to log a well while it is being drilled in order to determine the probable extent of the drilling operation and the presence of oil-bearing strata. Electrical well logging has been found to be more accurate and dependable than other methods of logging. Originally it was proposed to run a cable down through the string of drilling pipe for transmitting electrical signals during the drilling operation at or near the bottom of the well. Clearly this method involved many mechanical difficulties, for each time a new section of drill pipe was added to the string it was also necessary to add a new section of cable which had to be insulated from the drill pipe at all times.

To overcome these difficulties another method was proposed for logging a well electrically during the drilling operation. This method involves the continuous transmission of electrical waves by the use of a small transmitter contained entirely within the drill pipe near the drill bit. The apparatus was so arranged that the potential of the transmitted electrical waves was varied in accordance with the electrical resistance of the strata through which the transmitter was passing. A receiving device at the surface picks up and records the electrical waves, variations in the potential of the electrical waves indicating variations in the strata through which the waves are transmitted. Unfortunately the usual stray earth currents are also picked up by the receiving device so that the final recording will be affected thereby giving inaccurate and undependable information.

It is therefore an object of the present invention to provide a simplified method and apparatus which gives reliable and accurate information as to the nature of the strata in the well, as well as other desirable information.

According to the present invention it is possible to transmit electrical waves of different average amplitude through a transmitting medium for differing periods of time so that the relative intervals during which waves of one amplitude are transmitted and the intervals during which waves of a different amplitude are transmitted gives the desired information. Also, according to the present invention, electrical waves may be transmitted, not continuously, but intermittently and recurrently, and the relative lengths of the intervals during which waves are transmitted or are not transmitted gives the desired information as to the electrical resistance or other particular phenomenon being measured. It is clear therefore that, according to my invention, I am not concerned with the actual or relative amplitudes of the electrical waves as received at the surface but merely with the relative lengths of the intervals during which signals are received. The term "signal" as used herein is intended to cover the transmission of electrical waves whether of the same or different amplitude as well as the interruption of transmission of electrical waves.

Broadly my invention consists in transmitting signals and intermittently and recurrently interrupting or varying these signals, the duration of each signal being controlled by means which are responsive to the resistance of the formation or other phenomenon being measured. Whenever the resistance is high, the duration of the signal is long, whereas if the resistance is low the duration of the signal is short. The apparatus may be continuously calibrated by recurrently comparing the length of a signal due to the phenomenon being measured with the length of the signal when no resistance or when a fixed or known resistance is involved in the measurement.

The invention will now be described with particular reference to the drawings which form a part of the present specification.

Figure 1 shows one form of my invention for obtaining valuable information while drilling a well;

Figure 1a shows a partial modification of the arrangement shown in Figure 1;

Figure 2 shows one form of apparatus which may be used for receiving the electrical waves passing through the ground and recording the same;

Figure 3 represents a recording obtained by using the apparatus shown in Figure 1;

Figure 4 shows another form of my invention for obtaining valuable information while drilling a well;

Figure 5 shows a recording obtained by using the apparatus shown in Figure 4 or Figure 1a;

Figure 6 shows still another form of my invention;

Figure 8 shows still other arrangement for obtaining valuable information while drilling wells; and Figure 8a shows a modification of the arrangement shown in Figure 8.

Figure 7:
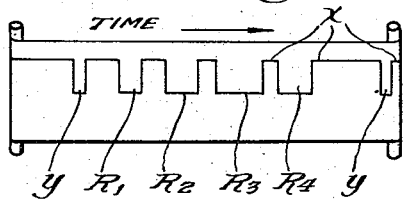
Figure 7 shows a recording obtained by using the apparatus shown in Figure 6.

Referring to Figure 1, an insulated section 11 is located between a string of drill pipe 12 and the drill collar 13. The electrical circuits and apparatus shown in the various figures are contained within the insulated column 11. A lead 14 is connected to drill pipe 12 while lead 15 is connected to drill collar 13 forming two spaced electrodes insulated from each other. A shunt motor 16 driven by battery 17 drives a commutator 18. A brush 19 associated with the commutator 18 is electrically connected with oscillator or alternator 20. Another brush 21 is associated with the shaft of commutator 18. Obviously any other type of make and break apparatus which is operated by motor 16 may be used in place of commutator 18. As shown in the drawings, brush 21 is connected to lead 14. A choke coil 22 is provided in lead 14, as shown in the drawings, while a condenser 23 is provided between oscillator 20 and lead 15. Line 24 connects lead 15 with shunt motor 16. The operation of the apparatus shown in Figure 1 is as follows:

Shunt motor 16 is driven by battery 17 at a speed depending on the resistance encountered between drill pipe 12 and drill collar 13 which is a function of the resistivity of the formations, the circuit comprising battery 17, motor 16, line 24, lead 15, drill collar 13, the earth adjacent insulated section 11, drill pipe 12, lead 14, choke coil 22, and battery 17. Since the motor 16 drives commutator 18, the oscillator 20 will, during intermittent periods of time, transmit electrical waves between drill pipe 12 and drill collar 13. When contact is established between brush 21 and brush 19 through the commutator, alternating current will pass through the circuit from oscillator 20, brush 19, commutator 18, brush 21 to lead 14, then to drill collar 13, drill pipe 12, lead 15, condenser 23 and oscillator 20. In this form of the invention, the length of the period during which electrical waves are transmitted is dependent on the speed of motor 16, which in turn is dependent on the resistance encountered between pipe 12 and collar 13. Likewise, the length of the period during which electrical waves are not being transmitted will also depend on the resistance between pipe 12 and collar 13. The electrical waves which are transmitted between the pipe 12 and collar 13 will find their way to the surface of the earth where they will be picked up, amplified, and recorded. Referring now particularly to Figure 2, two electrodes 25 and 26 are placed in the ground at spaced points from the well. Since there will be a difference of potential between electrodes 25 and 26, current will flow through lines 27 and 28. This current is amplified in amplifier 29 in order to operate recording mechanism 30 and also potentiometer 31. Also included is a narrow band pass filter 31a, tuned to include the frequency of the oscillator 20. This is for the purpose of increasing the signal-to-noise ratio and of eliminating much of the random waves picked up by electrodes 25 and 26. A recording obtained by the apparatus shown in Figure 1 is shown in Figure 3. In this figure the relatively long periods of time during which the electrical waves are transmitted, as well as the relatively long periods of time during which no electrical waves are transmitted, is shown on the left-hand side. This indicates that the insulated section 11 is at that time passing through a formation having high electrical resistivity. As time proceeds the "on" and "off" periods become shorter, thereby indicating that the insulated section 11 is passing through strata having lower electrical resistivity than the preceding strata. While for simplicity square waves are shown as being recorded, the record will actually be distorted into exponential curves depending on the sharpness of the filter 31a.

A modified form of Figure 1 is shown in Figure 1a, wherein the commutator 18 is used to make or break an auxiliary circuit containing battery 32 and relay 33. When this last-mentioned circuit is excited by making contact through commutator 18, the alternating current circuit will be closed through relay 33 and electrical waves will be transmitted between drill pipe 12 and drill collar 13. While the arrangement shown in Figure 1 is more simplified and requires less apparatus, it may be desirable to use the apparatus shown in Figure 1a in order to establish a better contact through the contact points of relay 33 than is possible when using a commutator and brush as in Figure 1. Also involved in Figure 1a is the feature that when the relay 33 is deenergized the electrodes are short circuited and the motor runs at maximum speed. This automatically calibrates the transmission system since the "off" period is substantially constant being affected only by those internal changes in the circuit which have an effect on the speed of rotation of the motor. A record obtained by using the arrangement shown in Figure 1a will correspond with that shown in Figure 5.

The form of the invention shown in Figure 4 comprises a series of alternating current motor 34 which drives commutator 35. In this modification an oscillator 36 is provided in lead 14 which supplies current to the entire apparatus. According to this modification, the motor 34 will be driven at maximum speed when electrical waves are not being transmitted and, when electrical waves are being transmitted, the motor 34 will attain a speed determined by the resistance encountered through the earth formation between drill pipe 12 and drill collar 13 as in Figure 1a. When the commutator 35 establishes contact between brush 37 and brush 37a, the motor will run at maximum speed and no electrical waves will be transmitted, since the resistance between the drill pipe 12 and the drill collar 13 will be short circuited. On the other hand, when there is no electrical connection between brush 37 and brush 37a, the alternating current will pass from oscillator 36 through motor 34, lead 15 to drill collar 13 through the earth to drill pipe 12 thence through lead 14 back to oscillator 36. When using an apparatus according to Figure 4, a recording will be obtained as shown in Figure 5. It will be noted in this instance that the "off" periods will remain substantially constant since during these periods the motor is being driven at a speed dependent solely on the output of the oscillator 36 and in no way dependent upon the resistance between drill pipe 12 and drill collar 13. On the other hand, during the "on" period, when electrical waves are being transmitted, the speed of the motor is directly dependent on the resistance between pipe 12 and collar 13.

If desired, a modified arrangement including an auxiliary circuit containing a battery and relay, as shown in Figure 1a, may be used in the arrangement shown in Figure 4.

According to Figure 6, apparatus is shown whereby not only the resistance of the formation may be determined but also various other valuable information may be obtained. As examples, it is possible to determine resistance of the drilling mud, the torque of the drill pipe, the compression or tension of the drill pipe, and the temperature of the drill pipe and the like. According to Figure 6, commutators 38 and 39 are provided, both of which are driven by a series A. C. motor 40. Each of the commutators 38 and 39 are provided with alternating insulated and conducting segments such as 41, 41a, and 42 and 42a. Each commutator has a contact arm 43 and 44. These contact arms are so arranged that when one of the arms contacts an insulated segment, the other arm contacts a conducting segment and closes a circuit. As shown in the drawings, contact arm 44 is touching an insulated segment 42, whereas contact arm 43 is establishing through segment 45 an electrical connection with resistance $R_1$. As the commutators rotate, the circuit through segment 45 will be broken and the circuit through segment 46 of commutator 39 will be established. It will be noted that all of the conducting segments of commutator 39 are electrically connected with lead 47 to drill collar 13 whereas the conducting segments of commutator 38 establish successive circuits through $R_1$, $R_2$, $R_3$, $R_4$, etc., and line 48. According to this modification and while brushes 43 and 44 are being rotated, electrical waves will be transmitted only during the period when contact arm 44 establishes contact through the conducting segments to lead 47. During these periods there will be no circuit established through commutator 38. The speed of the motor 40 will under these conditions be governed by the resistance between drill collar 13 and drill pipe 12. The complete circuit will be from oscillator 49, through motor 40, line 50, brush 51, contact arm 44, segment 46, lead 47, drill collar 13, the earth, drill pipe 12, and back to oscillator 49. On the other hand, when the circuit through commutator 39 has been broken and a circuit through commutator 38 has been established, no electrical waves will be transmitted between pipe 12 and collar 13, and the speed of the motor will depend on the resistance which may or may not be present in the particular circuit which has been established. If, for instance, a circuit has been established through segment 52, the motor will run at full speed since the circuit through line 48 will contain no resistance. This particular circuit may be used for calibrating the apparatus. On the other hand, if a circuit has been established through segment 45 and $R_1$, the speed of the motor will depend on the value of $R_1$ and the length of the "off" time will be governed accordingly. In Figure 6 $R_1$, $R_2$, $R_3$, and $R_4$ have been shown as conventional resistances. However, for the purposes of this invention, these resistances may be determined by the drilling mud as in Figure 7a, the torque of the drill pipe as in Figure 7b, the compression or tension of the drill pipe as in Figure 7c, and/or the temperature of the drill pipe as in Figure 7d. These resistances will govern the speed of motor 40 during the "off" periods and will give an indication as to the value of the particular resistance being measured. In Figure 7 a recording is shown which could be obtained according to the apparatus shown in Figure 6. In this figure the length of the "on" periods, indicated by $x$, is determined by the resistance of the formation, the longer periods indicating a high resistance, and the shorter periods indicating a lower resistance of the formation. On the other hand, the length of the "off" periods will indicate in sequence each of the other values which are being recorded. The short "off" periods indicated by $y$ are those in which a closed circuit is established through line 48 and the motor will run at maximum speed. The "off" periods indicated by $R_1$, $R_2$, $R_3$, and $R_4$ will in each case give an indication of the resistance encountered when those particular circuits have been established through commutator 38. Clearly a single rotation of commutator 38 will give a single indication of each of the resistances being determined. The following complete rotation of commutator 38 will give a complete repetition of the resistances being measured in the same order. On the other hand, during one rotation of commutator 39 the resistance of the formation will be measured at five different times. It will be obvious that any number of segments may be used in both commutators 38 and 39, and that the five segments shown in the drawings are by way of example only. It will be clear, however, that commutators 38 and 39 must have the same number of conducting and insulating segments and that they must be arranged so that when one commutator establishes a circuit the other commutator is breaking a circuit.

It will be obvious to any one skilled in the art that many different variations of the arrangement shown in Figure 6 can be devised without departing from the fundamentals of the present invention. For example, commutator 39 may be used to make and break an auxiliary circuit containing a source of current and a relay as shown in Figure 1a. Also, it would be possible, and at times preferable, to substitute a fixed known and relatively high resistance in place of $R_1$, $R_2$, $R_3$, or $R_4$, so that the apparatus could be calibrated not only at minimum resistance through line 48 but also at maximum resistance through the fixed known resistance. Furthermore, when desired the wiring could be arranged so that the formation resistivity between drill pipe 12 and drill collar 13 would be measured only once during every revolution of the commutators while at the same time a series of calibration measurements would be made.

Figure 7A:
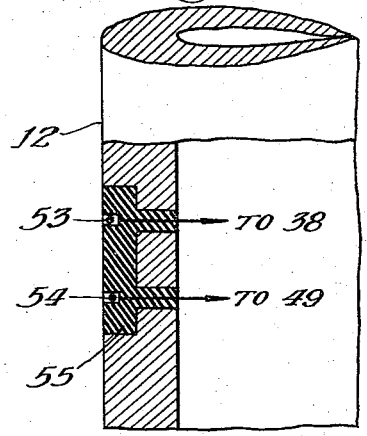
Figure 7a shows an arrangement for determining the resistance of drilling mud, which can be used in connection with the apparatus shown in Figure 6.

As examples of resistances $R_1$, $R_2$, $R_3$, and $R_4$, reference is made to Figures 7a, 7b, 7c, and 7d. In Figure 7a, two metal rings 53 and 54 are provided around the outside of drill pipe 12 for determining the resistivity of the drilling mud. If desired, these rings may be provided about the insulated section 11. In the drawings the rings are insulated from pipe 12 by insulation 55, a lead from one ring is connected to a segment of commutator 38, while the other lead is connected to oscillator 49. When this circuit is established the length of the "off" time will give an indication of the nature of the drilling mud.

Figure 7B:
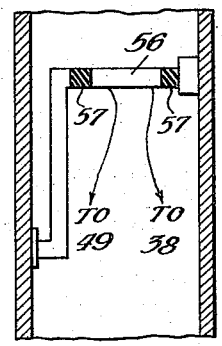
Figure 7b shows an arrangement for determining the torque of the drilling pipe.
Figure 7C:
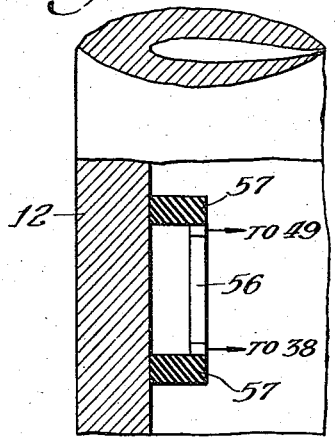
Figure 7c shows an arrangement for determining the compression (or tension) of the drilling pipe.

In Figures 7b and 7c, a carbon rod 56 or other resistance such as the bonded metalectric strain gage manufactured by the Baldwin Southwork Company, is placed inside the drill pipe 12 and is securely fixed at each end to the pipe but insulated therefrom by insulators 57. Leads from the ends of the resistance 56 are connected to a segment of commutator 38 and oscillator 49 respectively. The arrangement shown in Figure 7b will give an indication as to the torque of the drill pipe 12 while Figure 7c will give an indication of the compression or tension of drill pipe 12.

Figure 7D:
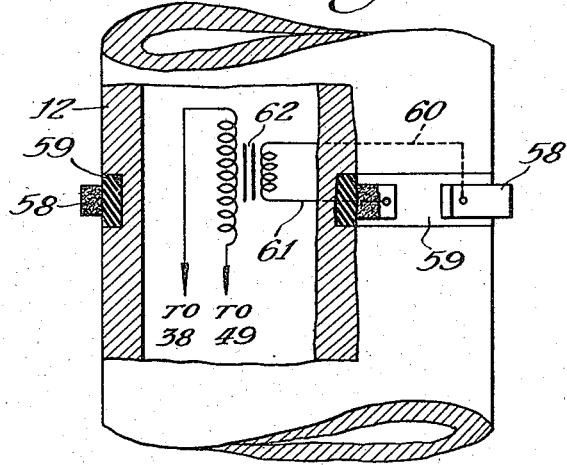
Figure 7d shows an arrangement for determining the temperature of the drilling pipe.

In Figure 7d, apparatus is shown for determining the temperature of the drill pipe. A split metal ring 58 of material having a high temperature coefficient of resistance is placed around the drill pipe 12 and insulated therefrom by insulation 59. Leads 60 and 61 are connected to the short winding of a transformer 62, whereas the long winding of the transformer is connected to commutator 38 and the oscillator 49. In this way small differences in current flow through split ring 58 due to the variations in temperature of the ring will be increased so that indications of differences in the temperature of the drill pipe will be magnified on the recording device. Apparatus as shown in Figure 7d is similar to that shown in Patent 2,245,700, issued to W. D. Mounce.

Obviously, alternatives and equivalents of the apparatus shown in Figures 7a, 7b, 7c, and 7d are contemplated within the scope of the present invention.

While the foregoing examples have referred to apparatus wherein electrical waves are transmitted intermittently and the "on" and "off" periods recorded, it is also possible to provide arrangements whereby electrical waves of varying amplitude are transmitted substantially continuously as shown in Figures 8 and 8a. In Figure 8, direct current waves are transmitted but instead of interrupting the signals for an appreciable time the direction of the current is intermittently reversed, the time period for the transmission in one direction depending on the resistivity of the formation while the time period for transmission in the opposite direction is substantially constant and is used for calibration purposes. In Figure 8, a direct current shunt motor 63 drives commutator 64, which in turn makes and breaks the auxiliary circuit containing the solenoid 65, for operating double pole double throw switch 66. Batteries 67 and 68 are connected in such manner that when the solenoid is deenergized, as shown in the drawings, the motor circuit includes the resistance encountered between drill pipe 12 and drill collar 13, all of the current being supplied by battery 67. In this case drill pipe 12 will be + and the drill collar —. When the solenoid is energized, battery 68 supplies the current for the electrical waves and the drill pipe 12 will be — and the drill collar 13 +.

When transmitting direct current waves through the formation the amplifier 39 shown in Figure 2 should be a direct current amplifier. Although filter 31a may be retained if desired, it will be normally found to be unnecessary.

According to Figure 8a, battery 69, with poles reversed is substituted for battery 68 in Figure 8. Battery 69 should preferably have a higher potential than battery 67. In this arrangement direct current waves of one potential are transmitted during one period and waves of a higher potential are transmitted during the other period.

In both the arrangements of Figure 8 and Figure 8a, the waves, which are picked up, are recorded as a function of time so that the length of time during which similar signals are received will indicate the degree of electrical resistance between the drill pipe 12 and drill collar 13 which in turn gives an indication of the physical characteristics of the formation.

Since all of the circuits shown must depend on the output of batteries disposed within the insulated section 11, and since the output of batteries will vary in time, it is highly desirable to constantly calibrate the apparatus. While the output of a battery is constant, the final results may be obtained by merely determining the length of time a particular signal is received; but when the output of a battery decreases, the final results must be obtained by determining the ratio of the time for a particular signal to the time of a calibration signal.

It will be understood that various alterations in wiring circuits and in instruments and apparatus may occur to those skilled in the art without departing from the spirit of the invention.

Although the present invention has been described by reference to specific embodiments, it is to be understood that these are by way of example only and are not to be construed as limitations of the scope of the invention. The scope of the present invention is to be defined only by the claims appended hereto.

I claim:

1. An electrical telemetering system for transmitting signals through a transmitting medium, the duration of said signals indicating desired information, comprising means for supplying electric current to points in said medium for transmission therethrough, means for intermittently and recurrently varying at least one known characteristic of said electric current to form at least two signals having different characteristics, means responsive to an electrical resistance which varies as a function of the information desired for controlling the duration of at least one of said signals, the duration of at least one other of said signals being uninfluenced by the desired information, and means for receiving said signals and for producing an indication of the duration of said signals.

2. An electrical telemetering system for transmitting signals through a transmitting medium, the duration of said signals indicating desired information, comprising means for supplying electric current to points in said medium for transmission therethrough, means for intermittently and recurrently interrupting the supply of current to said points to form at least two signals, means responsive to an electrical resistance which varies as a function of the information desired for controlling the time during which current is supplied to said points, and means for receiving said signals and for producing an indication of the duration of said signals.

3. An electrical telemetering system for transmitting signals through a transmitting medium, the duration of said signals indicating desired information, comprising means for supplying electric current to points in said medium for transmission therethrough, means for intermittently and recurrently reversing the current supplied to said points to form at least two signals, means responsive to an electrical resistance which varies as a function of the information desired for controlling the duration of at least one of said signals, and means for receiving said signals and for producing an indication of the duration of said signals.

4. An electrical telemetering system for transmitting signals through a transmitting medium, the duration of said signals indicating desired information, comprising means for supplying electric current to points in said medium for transmission therethrough, means for intermittently and recurrently increasing the amplitude of said current to form at least two signals, means responsive to an electrical resistance which varies as a function of the information desired for controlling the duration of at least one of said signals, and means for receiving said signals and for producing an indication of the duration of said signals.

5. An electrical telemetering system for transmitting signals, the duration of which indicates desired information comprising at least two electrodes insulated from each other, means for supplying current to said electrodes for transmitting electrical waves, means for intermittently and recurrently interrupting the transmission of said waves, means responsive to an electrical resistance which varies as a function of the information desired for controlling the time during which said waves are transmitted, and means for receiving said electrical waves and for producing an indication of the time during which said electrical waves are transmitted.

6. An electrical telemetering system for indicating and recording valuable information while drilling a well with a drill bit comprising at least two electrodes insulated from each other located near the drill bit, means for supplying current to said electrodes for transmitting electrical waves, means for intermittently and recurrently interrupting the transmission of said waves, means responsive to the resistance between said electrodes for varying the time during which said waves are transmitted, means at the surface of the earth for receiving said waves and for recording an indication of the waves received as a function of time.

7. An electrical telemetering system for indicating and recording valuable information while drilling a well with a drill bit comprising at least two electrodes insulated from each other located near the drill bit, means for supplying current to said electrodes for transmitting electrical waves, a commutator for intermittently and recurrently interrupting the transmission of said waves, means responsive to the resistance between said electrodes for varying the speed of the commutator while said waves are being transmitted, means for receiving said waves and for recording an indication of the waves received as a function of time.

8. An electrical telemetering system for indicating and recording valuable information while drilling a well with a drill bit comprising at least two electrodes insulated from each other located near the drill bit, means for supplying current to said electrodes for transmitting electrical waves, a commutator for intermittently and recurrently interrupting the transmission of said waves, a motor for driving said commutator, the speed of said motor being responsive to the resistance between said electrodes, means for receiving said waves and for recording an indication of the waves received as a function of time.

9. An electric telemetering system for transmitting signals through a transmitting medium, the duration of said signals indicating desired information, comprising means for supplying electric current to points in said medium for transmission therethrough, means for intermittently and recurrently varying at least one known characteristic of said electric current to form at least two signals having different characteristics, means responsive to an electrical resistance which varies as a function of the information desired for controlling the duration of at least one of said signals, and means for receiving said signals and for producing an indication of the duration of said signals.

10. An electrical telemetering system for indicating and recording valuable information while drilling a well with a drill bit comprising at least two electrodes insulated from each other and located near the drill bit, means for supplying current to said electrodes for transmitting electrical waves, means for intermittently and recurrently varying at least one known characteristic of said current to form at least two signals having different characteristics, means responsive to an electrical resistance which varies as a function of the information desired for controlling the duration of at least one of said signals, means at the surface of the earth for receiving said signals and for recording an indication of the signals received as a function of time.

11. An electrical telemetering system for indicating and recording valuable information while drilling a well with a drill bit comprising at least two electrodes insulated from each other located near the drill bit, means for supplying electric current to said electrodes for transmitting electrical waves, means for intermittently and recurrently varying at least one known characteristic of said electric current to form at least two signals having different characteristics, means responsive to the resistance between said electrodes for controlling the duration of at least one of said signals, means at the surface of the earth for receiving said signals and for recording an indication of the signals received as a function of time.

12. An electrical telemetering system for indicating and recording valuable information while drilling a well with a drill bit comprising at least two electrodes insulated from each other and located near the drill bit, means for supplying electric current to said electrodes for transmitting electrical waves, means for intermittently and recurrently reversing the current supplied to said electrodes to form at least two signals, means responsive to an electrical resistance which varies as a function of the information desired for controlling the duration of at least one of said signals, and means at the surface of the earth for receiving said signals and for producing an indication of the duration of said signals.

13. An electrical telemetering system for indicating and recording valuable information while drilling a well with a drill bit comprising at least two electrodes insulated from each other and located near the drill bit, means for supplying electric current to said electrodes for transmitting electrical waves, means for intermittently and recurrently increasing the amplitude of said current to form at least two signals, means responsive to an electrical resistance which varies as a function of the information desired for controlling the duration of at least one of said signals and means at the surface of the earth for receiving said signals and for producing an indication of the duration of said signals.

14. An electrical telemetering system for transmitting signals through a transmitting medium, the duration of said signals indicating desired information, comprising means for supplying alternating current to points in said medium for transmission therethrough, means for intermittently and recurrently interrupting the supply of current to said points to form two signals, means responsive to an electrical resistance which varies as a function of the information desired for controlling the time during which current is supplied to said points, and for maintaining substantially constant the time during which current is not supplied to said points so that the system may be calibrated, and means for receiving said signals and for producing an indication of the duration of said signals.

DANIEL SILVERMAN.